United States Patent [19]

Wolf

[11] 4,262,441

[45] Apr. 21, 1981

[54] MAGIC MAILBOX

[76] Inventor: Tobin Wolf, 285 Aycrigg Ave., Passaic, N.J. 07055

[21] Appl. No.: 11,523

[22] Filed: Feb. 12, 1979

[51] Int. Cl.³ .................. A63H 33/00; G02B 27/08
[52] U.S. Cl. .................................... 46/1 R; 350/4.1
[58] Field of Search ............... 46/1 R; 350/4.1, 4.2; 272/8 M

[56] References Cited

U.S. PATENT DOCUMENTS

| 754,143 | 3/1904 | Johnson | 350/4.2 |
| 1,010,808 | 12/1911 | Scheufler | 350/4.1 |
| 1,968,759 | 7/1934 | Gill et al. | 272/8 M X |
| 2,747,297 | 5/1956 | Zalkind | 35/22 A X |
| 3,235,263 | 2/1966 | Smith | 35/22 A X |
| 3,603,663 | 9/1971 | Lewis | 350/4.1 |
| 3,787,987 | 1/1974 | Brass | 46/1 R X |

FOREIGN PATENT DOCUMENTS

835531 4/1952 Fed. Rep. of Germany ............ 350/4.2

Primary Examiner—F. Barry Shay
Attorney, Agent, or Firm—Jay M. Cantor

[57] ABSTRACT

A mailbox-shaped container having a plurality of openings, each designed to receive packages of a different size and shape with a rotatable platform at the bottom of the container and a hinged transparent door at the rear of the container for permitting light to pass into the container and on to the platform and to permit removal of packages from the container. A kaleidoscope is secured to the container and passes therethrough so that an observer can view the contents of the container from the outside through the kaleidoscope and, at the same time, obtain the view of brightly colored objects rotating on the platform with a kaleidoscopic effect. The output from the kaleidoscope will continually change by rotation of the rotatable platform either manually from the outside of the container to which the platform extends or by other motive means.

4 Claims, 4 Drawing Figures

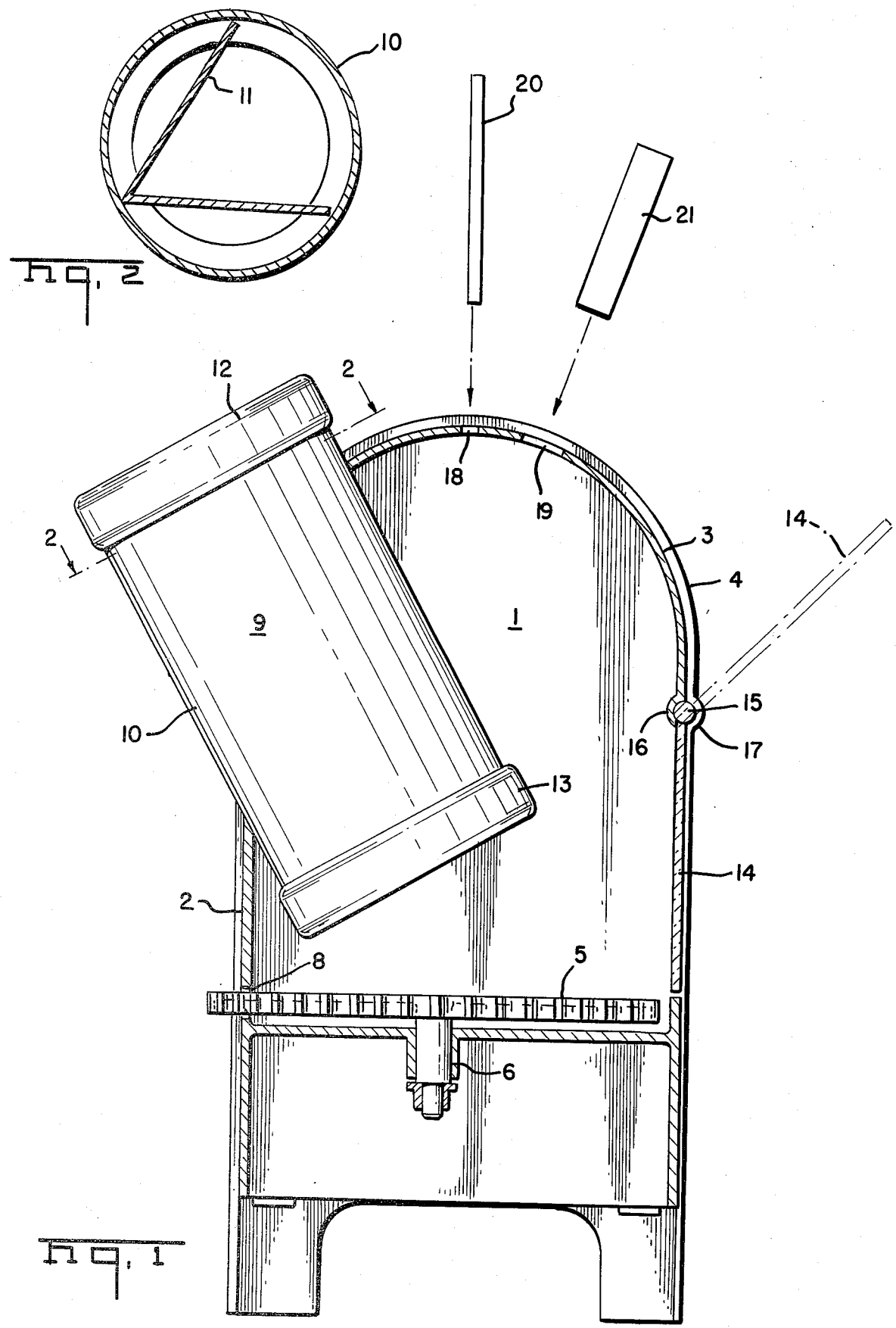

MAGIC MAILBOX

BACKGROUND OF THE INVENTION

This invention relates to a toy which is designed to teach young children to identify various sizes and shapes and, in addition thereto, to provide an additional level of pleasure to the user.

PRIOR ART

The prior art has known many devices for teaching children to recognize and identify various sizes and shapes. In addition, the kaleidoscope has been well-known in the prior art. However, it is always desirable to provide toys which are both educational and are also capable of rendering an additional source of enjoyment to the operator so that the child will not soon tire from the toy.

BRIEF DESCRIPTION OF THE INVENTION

The invention relates to a mailbox-shaped container having a plurality of openings, each designed to receive packages of a different size and shape with a rotatable platform at the bottom of the container and a hinged transparent door at the rear of the container for permitting light to pass into the container and on to the platform and to permit removal of packages from the container. A kaleidoscope is secured to the container and passes therethrough so that an observer can view the contents of the container from the outside through the kaleidoscope and, at the same time, obtain the view of brightly colored objects rotating on the platform with a kaleidoscopic effect. The output from the kaleidoscope will continually change by rotation of the rotatable platform either manually from the outside of the container to which the platform extends or by other motive means.

BRIEF DESCRIPTION OF THE DRAWINGS:

FIG. 1 is a sectional side view of the container in accordance with the present invention;

FIG. 2 is an end view of the kaleidoscope with the upper end cap removed;

BACKGROUND OF THE PREFERRED EMBODIMENT

Figure 3:
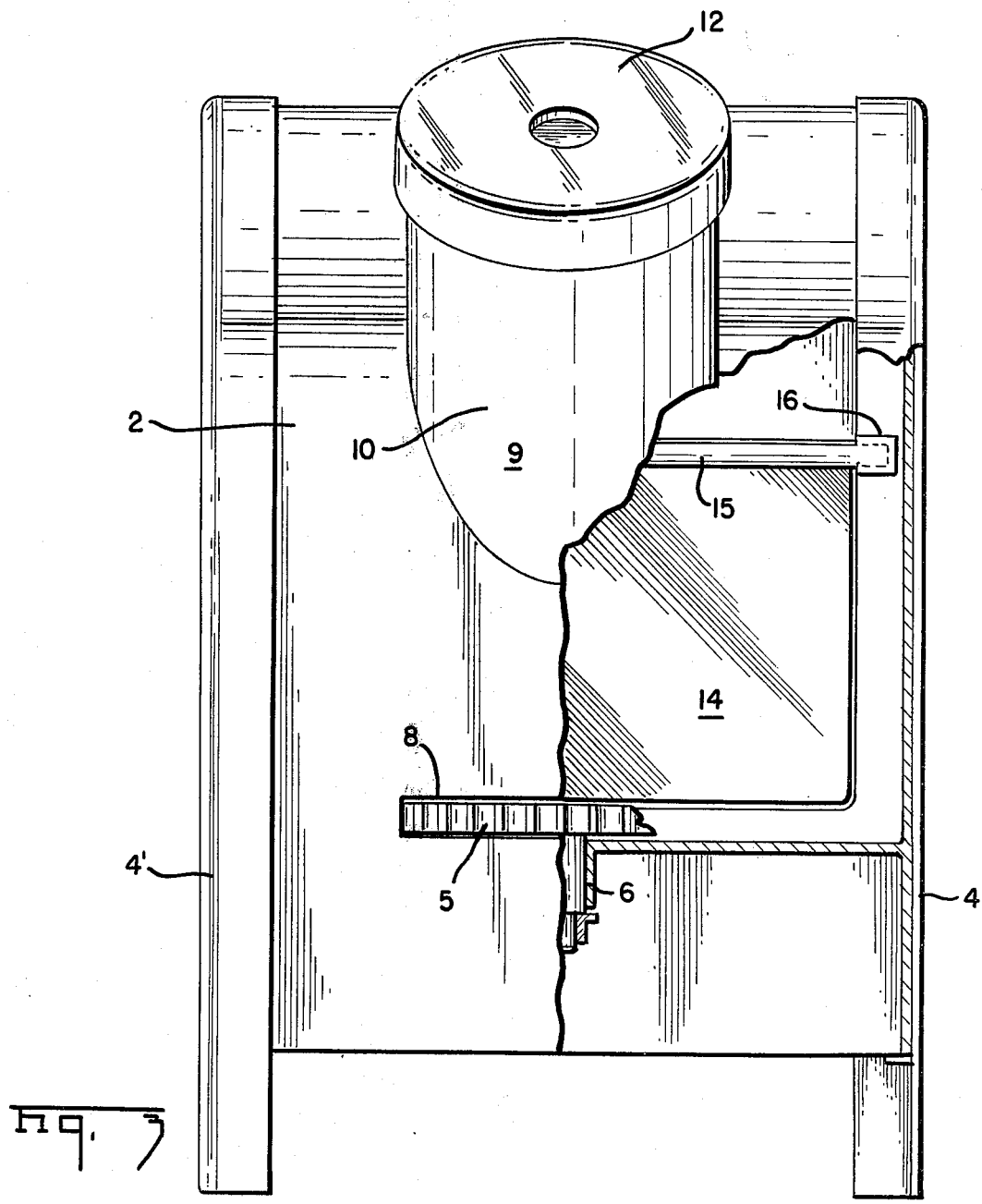
FIG. 3 is a front view in accordance with the present invention which is partly broken away to reveal the interior rear wall.

Referring first to FIGS. 1 and 3, there is shown a combination mailbox with rotatable base portion and kaleidoscope therein in accordance with the present invention. The mailbox is shown as 1 and includes a front half 2 and a rear half 3 with sides 4 and 4' with a top portion spanning the front and rear halves and the sides. The halves 2 and 3 can be formed of plastic or the like and together form a bearing 6 into which a rotatable platform 5 is journalled. The rim of the rotatable platform 5 extends through an aperture 8 in the front half 2 and is therefor accessible from the exterior of the mailbox. It can therefor be seen that the bearing 6 is located forward of the center line of the mailbox 1 in order to permit the rotatable platform 5 to extend beyond the front wall 2 and yet remain within the rear wall 3.

A kaleidoscope 9 is fastened to the front half 2 by conventional means, such as cement or the like, said kaleidoscope comprising a cylindrical tube 10 with end caps 12 and 13 and an aperture in the end cap 12 for viewing. Within the cylindrical tube 10, as best shown in FIG. 2, there is provided a V-shaped mirror 11, this mirror running the entire length of the tube 10 and being retained by the end caps 12 and 13. The mirror is preferably of polished metal for safety reasons.

Figure 4:
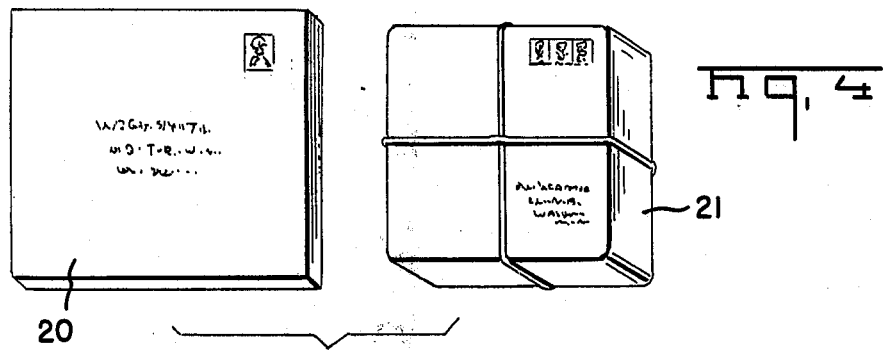
FIG. 4 are objects which would be entered into the container of FIG. 1.

A transparent rear door 14 having an integral hinge pin 15 is trapped in the bearing formed by the depression of the rear half 16 and the side cap 17. The mail slots 18 and 19, which are of different width and length, permit the insertion of the letter 20 into the slot 18 and the package 21 into the slot 19. The letter 20 and the package 21 are better shown in FIG. 4. The transparent rear door permits the removal of mailed objects and the entry of ambient light onto the platform 5.

In operation, a child will deposit letter 20 or boxes 21 through the respective slots and thereby learn to determine differences in shape and size since only certain ones of the letters and boxes supplied will fit into the respective slots 18 and 19. The packages can have various colors thereon. Accordingly, these packages when inserted through the respective slots 18 and 19, will fall onto the rotatable platform 5. The objects on the platform 5 will be lit by the ambient light passing through the transparent rear door 14 and such light will be reflected through the kaleidoscope 9 to provide the well known kaleidoscopic effect. The view through the kaleidoscope 9 is altered by rotation of the rotatable platform 5. This is accomplished by the operator rotating the platform 5 with the hand at the portion of the platform extending outside of the mailbox 1.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A toy mailbox which comprises in combination
   (a) a container having front, rear, side, bottom and top portions,
   (b) a platform secured to the bottom of said container and rotatable therein,
   (c) means comprising plural slots of different cross-sectional dimensions formed in said top portion of said container for entry into said container of objects of predetermined shape and dimensions, said slots being fully disposed above said platform,
   (d) a transparent region on a wall of said container for transmitting light onto said platform, and
   (e) a kaleidoscope passing through a wall of said container and secured thereto, said kaleidoscope having a pair of end portions, one of said end portions being within said container directed toward said platform and the other end portion extending externally of said container and having a viewing aperture therein, said transparent region comprising a door in said rear portion rotatably secured in said container and disposed adjacent said platform, said door movably closing an opening of a size and shape to permit removal of said objects.

2. A toy as set forth in claim 1 wherein said container forms a bearing, said platform being journalled in said bearing.

3. A toy as set forth in claim 1, wherein said container includes a slot in said front, said portion of said platform extending through said slot to the exterior of said container, said platform being disposed foward of the vertical axis of said container.

4. A toy as set forth in claim 2, wherein said container includes a slot in said front, said portion of said platform extending through said slot to the exterior of said container, said platform being disposed forward of the vertical axis of said container.

* * * * *